United States Patent [19]

Hashimoto et al.

[11] Patent Number: 5,084,760
[45] Date of Patent: Jan. 28, 1992

[54] COPYING MACHINE PROVIDING COPY PAPER CORRESPONDING TO READ IMAGE AREA

[75] Inventors: Kaoru Hashimoto, Hyogo; Toshikazu Kawaguchi; Hirofumi Hasegawa, both of Osaka, all of Japan

[73] Assignee: Minolta Camera Kabushiki Kaisha, Osaka, Japan

[21] Appl. No.: 304,233

[22] Filed: Jan. 31, 1989

[30] Foreign Application Priority Data

Feb. 1, 1988 [JP] Japan ................... 63-21649

[51] Int. Cl.⁵ .................... H04N 1/23; G03G 21/00
[52] U.S. Cl. .................... 358/300; 355/202; 355/311; 358/450; 358/453
[58] Field of Search ............... 355/200, 210, 218, 311, 355/202; 358/450, 453, 298, 300

[56] References Cited

U.S. PATENT DOCUMENTS

| | | | |
|---|---|---|---|
| 4,322,157 | 3/1982 | Miura et al. | 355/40 X |
| 4,384,272 | 5/1983 | Tanaka et al. | 382/50 |
| 4,580,171 | 4/1986 | Arimoto | 358/453 X |
| 4,805,135 | 2/1989 | Ochi et al. | 358/453 X |
| 4,970,550 | 11/1990 | Hirayama | 355/218 X |

FOREIGN PATENT DOCUMENTS

| | | | |
|---|---|---|---|
| 47-11451 | 4/1972 | Japan . | |
| 55-33151 | 3/1980 | Japan . | |
| 55-70163 | 5/1980 | Japan | 358/453 |
| 55-95459 | 7/1980 | Japan | 358/453 |
| 55-125771 | 9/1980 | Japan | 358/453 |
| 56-76681 | 6/1981 | Japan | 358/453 |
| 57-95756 | 6/1982 | Japan | 358/453 |
| 57-99081 | 6/1982 | Japan | 358/453 |
| 58-75955 | 5/1983 | Japan | 358/453 |

*Primary Examiner*—Fred L. Braun
*Attorney, Agent, or Firm*—Burns, Doane, Swecker & Mathis

[57] ABSTRACT

A plurality of index members movable in a scanning direction of a scanner are arranged at desired positions on a front portion of a platen glass. A black mark is applied on the rear surface of each of the index member and the original as well as the mark are read by an image reader, so that the position of the index member is detected. When the index member is detected as the scanner moves, the image data of the original included in the scanning area scanned by the scanner are not stored in the bit map memory until the next index member is detected. When the scanning is completed, the desired edited images are formed on a paper whose size is determined based on the amount of the stored image data.

14 Claims, 22 Drawing Sheets

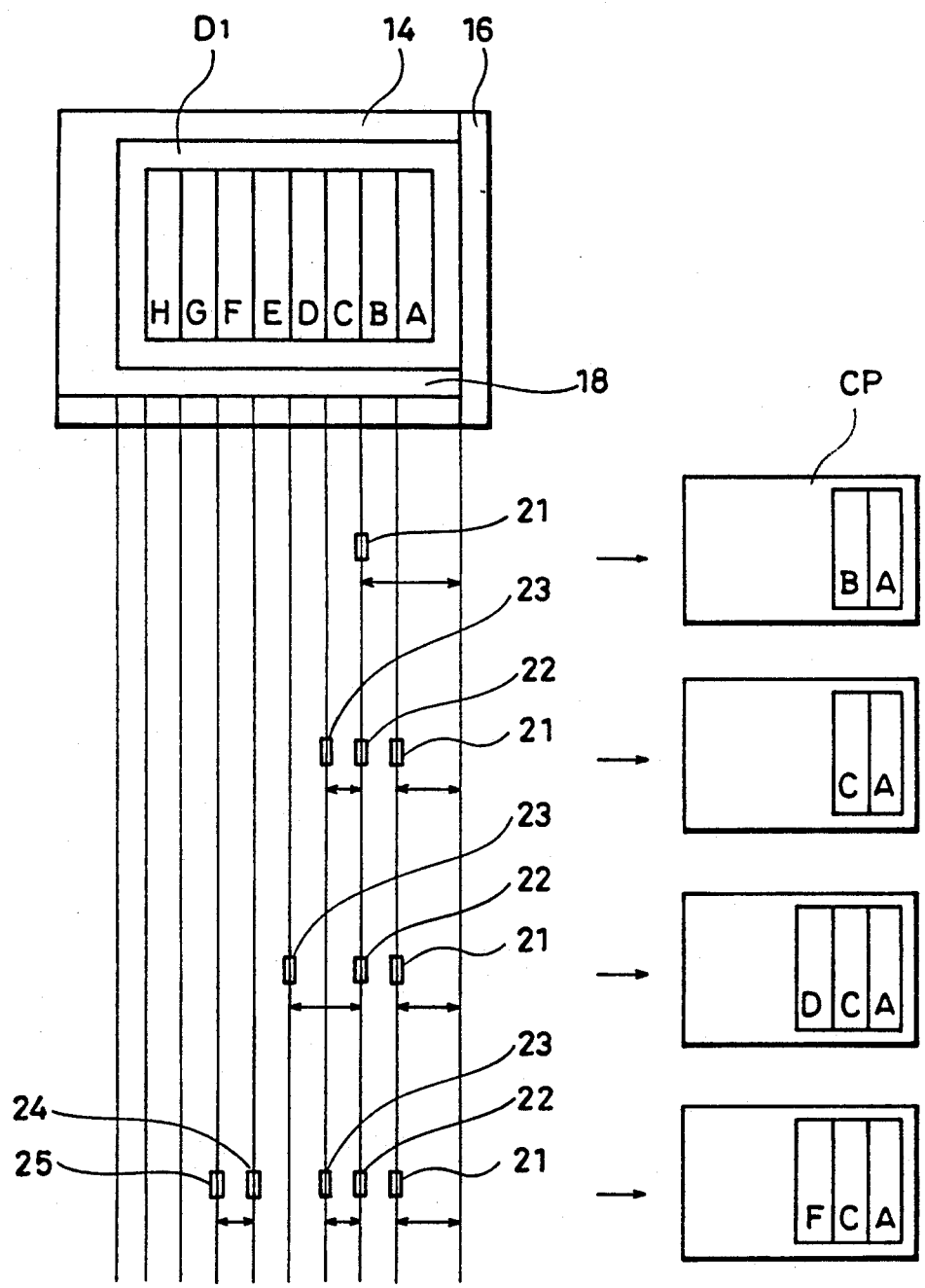

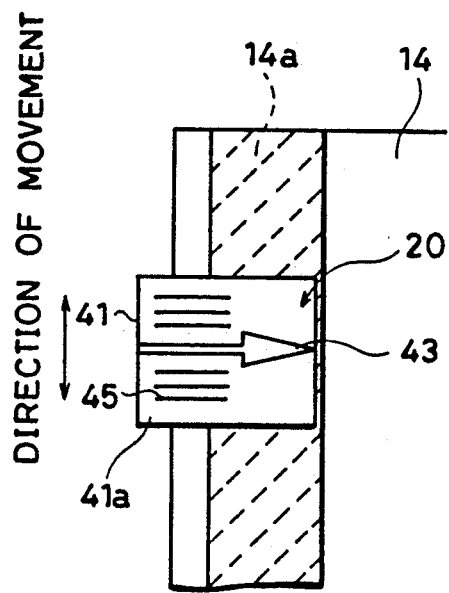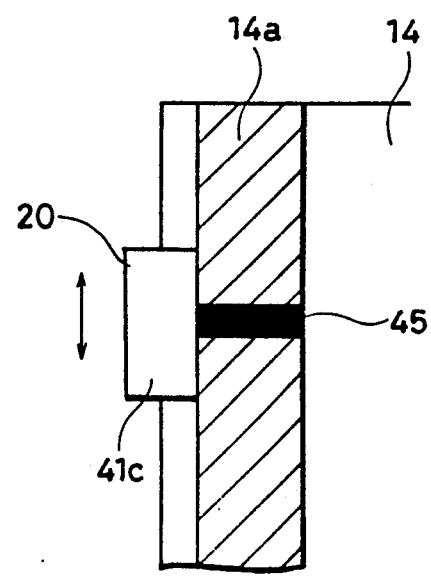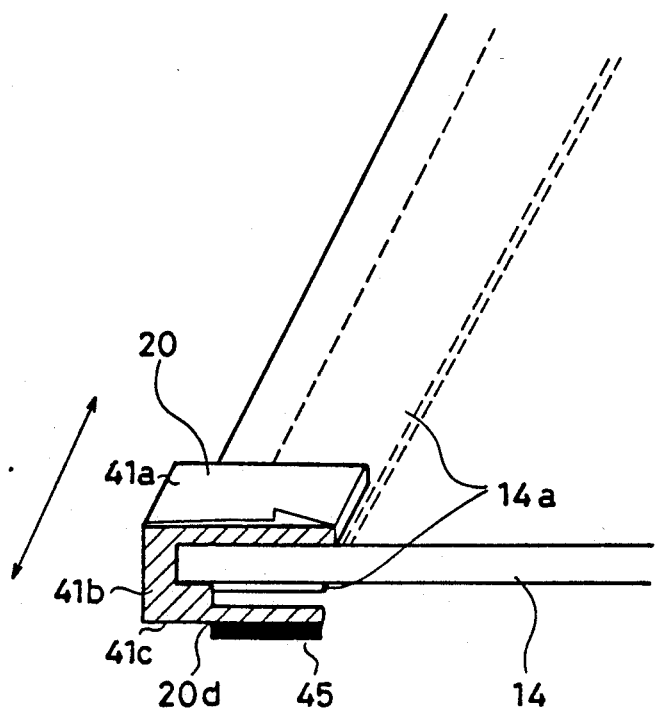

ORIGINAL(NAIN SCANNING DIRECTION) AREA   MARK AREA

COPYING MACHINE PROVIDING COPY PAPER CORRESPONDING TO READ IMAGE AREA

BACKGROUND OF THE INVENTION

1. Field of the Invention

The present invention relates to a copying machine and, more specifically, to a copying machine in which only necessary portions of read images are written into and read from a memory to be copied.

2. Description of the Related Art

FIG. 26 shows one example of an original of one's family register D1. The original of one's family register D1 has a margin M of a prescribed width on the right end thereof, a base column A on the left of the margin and columns B to G successively arranged on the left side of the base column A. The number and width of the columns B to G are various. The maximum width from the right end to the left end of the columns of the original D1, that is, the maximum range of images, is generally no more than a prescribed value.

When an extract copy of the resident register D1 is to be provided, the base column A and the necessary columns out of the columns B to G must be copied and edited so that they are continuously printed on one paper (this operation is sometimes referred as "column skip edition" or "column skip copying"). For example, when the columns C and F are needed, three columns including these two columns and the base column A are copied by column skip copying, and other columns are not copied. An extract such as shown in FIG. 7 is provided in this manner.

In the conventional image reading apparatus, the coordinates of four corners of a specified area on the platen glass are inputted by numerical keys provided on an operational panel, and only the image signals in the specified area are outputted as valid out of the images read by the image sensor to provide edition copying of a specified area.

However, in the conventional image reading apparatus, the input of the coordinates of necessary portions (columns) of the original (e.g. the family register D1) was very troublesome, requiring much time and labor. In addition, miscopies often occur due to erroneous inputs. Even if there is no error in inputs, there is a possibility of a miscopy when the position of the original placed on the platen glass is shifted from the normal position.

Japanese Patent Laying-Open Gazette No. 184047/1986 and Japanese Patent Publication Gazette No. 49781/1987 disclose an image reading apparatus in which a reading start position and a reading end position of the original can be set by a reading range setting portion and only the set range of the original is read by the image sensor. However, in the conventional image reading apparatus, the mechanical structure for reading only the set range by the image sensor becomes complicated. In addition, since the conventional device is for reading only a portion of the original, it is incapable of the above described column skip copying.

Meanwhile, when the above described edition is carried out, the copied paper CP becomes smaller than the original D1 as is apparent from the comparison between FIGS. 26 and 27. If the size of the copy paper CP is the same as that of the original D1, there will be large margins causing waste of paper, and the layout will not be nice to look at. Therefore, in the conventional copying machine, a user selects a paper to be fed estimating the appropriate size of the copy paper CP. If the estimated size is not correct, there is a possible miscopy, as the copy paper is too small for the images to be copied.

SUMMARY OF THE INVENTION

One object of the present invention is to facilitate copying operation in a copying machine capable of column skip editing.

Another object of the present invention is to carry out efficient copying operation in a copying machine capable of column skip editing.

A further object of the present invention is to carry out copying operation with appropriate paper corresponding to desired image areas in a copying machine capable of column skip editing.

A still further object of the present invention is to prevent miscopies in a copying machine capable of column skip editing.

In order to attain the above described objects, a copying machine in accordance with the present invention comprises, in a broad sense, a platen, image reading means, area designating means, memory means, image forming means and paper size determining means. An original is placed on the platen glass. The image reading means comprises a one dimensional image sensor and scanning means for reading images of the original placed on the platen. The area designating means designates a plurality of areas of the placed original. The memory means stores image data corresponding to the area designated by the area designating means out of the images read by the image reading means. The image forming means forms images on a paper based on the image data stored in the memory means. The paper size determining means determines the size of the paper based on the amount of the image data stored in the memory means.

In order to attain the above described objectives, a copying machine in accordance with the present invention comprises, in an aspect, a platen, optical scanning means, at least two index members, detecting means, output means, memory means, control means, image forming means, data amount checking means and paper size determining means. An original is placed on the platen. The optical scanning means comprises a one dimensional image sensor and projects images of the original onto the image sensor by scanning the original placed on the platen. The at least two index members are arranged on an end portion of the platen along the scanning direction of the optical scanning means, the members movable in the scanning direction. The detecting means detects the position of each of the index members. The output means outputs image data read by the image sensor. The memory means stores image data. The control means controls the memory means in response to a detection output from the detecting means such that image data of the original included in that scanning area scanned by the optical scanning means which is sandwiched by two of the index members are removed and the image data of the original included in the area scanned before the sandwiched area and the area scanned after the sandwiched area are stored continuously. The image forming means forms images on a paper based on the image data stored in the memory means. The data amount checking means checks the amount of image data stored in the memory means. The paper size determining means determines the size of the paper in response to the output from the data amount checking means.

In the copying machine structured as described above, the size of the copy paper is determined corresponding to the amount of image data stored in the memory means, so that the generation of miscopies can be prevented and the copying operation can be efficiently carried out.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates the manner of column skip edition employing the column skip levers in accordance with one embodiment of the present invention;

FIG. 8 is an enlarged plan view of the column skip lever of FIG. 6;

FIG. 9 is a plan view showing the rear surface of the column skip lever of FIG. 8;

FIG. 10 is a perspective cross sectional view showing a cross section of the central portion of the column skip lever shown in FIG. 8;

DESCRIPTION OF THE PREFERRED EMBODIMENTS

Figure 1:
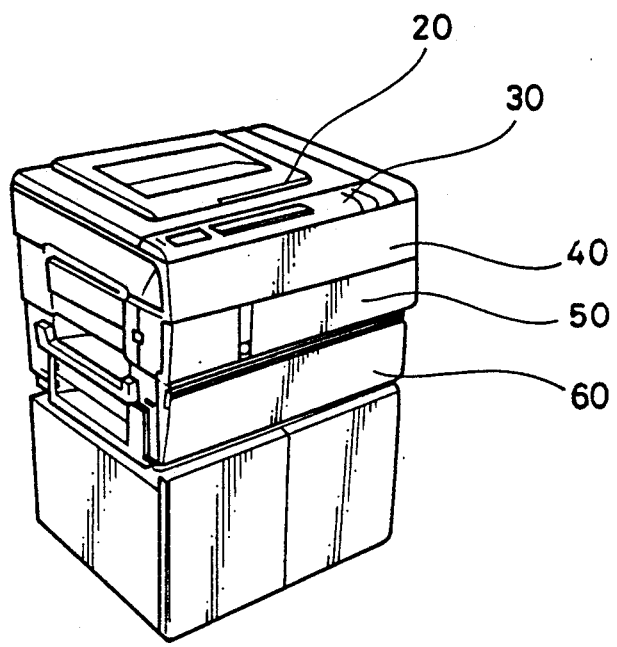
FIG. 1 is a perspective view showing an appearance of a copying machine in accordance with one embodiment of the present invention.
Figure 2:
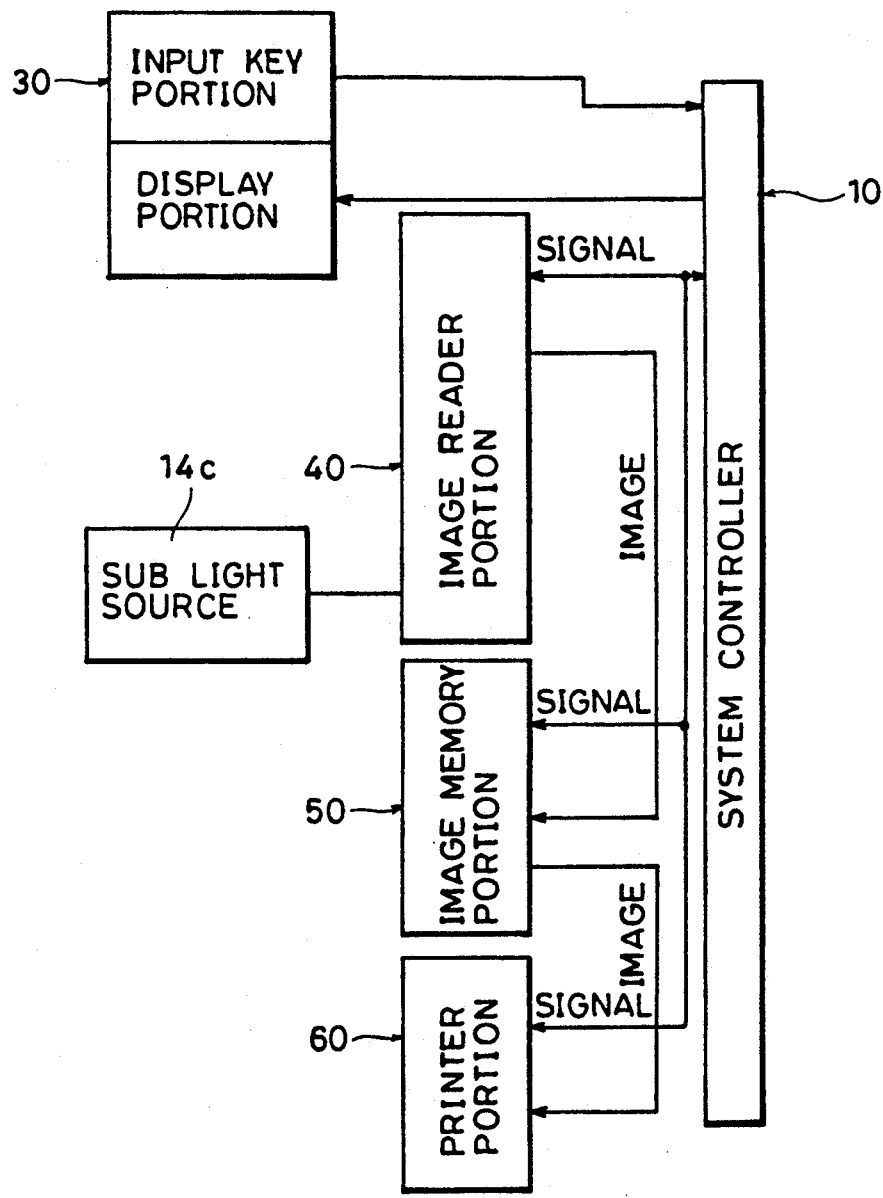
FIG. 2 is a block diagram showing a control system of the copying machine of FIG. 1.

FIG. 1 is a perspective view showing a digital copying machine as a whole having a page memory in accordance with one embodiment of the present invention and FIG. 2 is a block diagram showing the control of FIG. 1.

Referring to FIGS. 1 and 2, an operation panel 30 for determining the contents of the copying operation and column skip levers (or index levers) 20 for setting image areas to be read are arranged on an upper surface of a body of the copying machine. An image reader portion 40 for reading images is arranged in the upper portion of the copying machine. An image memory portion 50 for storing the read image data is provided at the central portion of the copying machine, and a printer portion 60 for providing a copy on a fed paper based on the image data stored in the image memory portion 50 is arranged therebelow. The operation panel 30 comprises an input key portion and display portions. The operation panel 30, the image reader portion 40, the image memory portion 50 and the printer portion 60 are connected to a system controller 10 to exchange signals with each other. The system controller 10 applies and receives signals to and from these portions to control the copying machine as a whole. A sub light source 14c for irradiating a platen glass is connected to the image reader portion 40 in order to facilitate the operation of the column skip levers 20.

Figure 3:
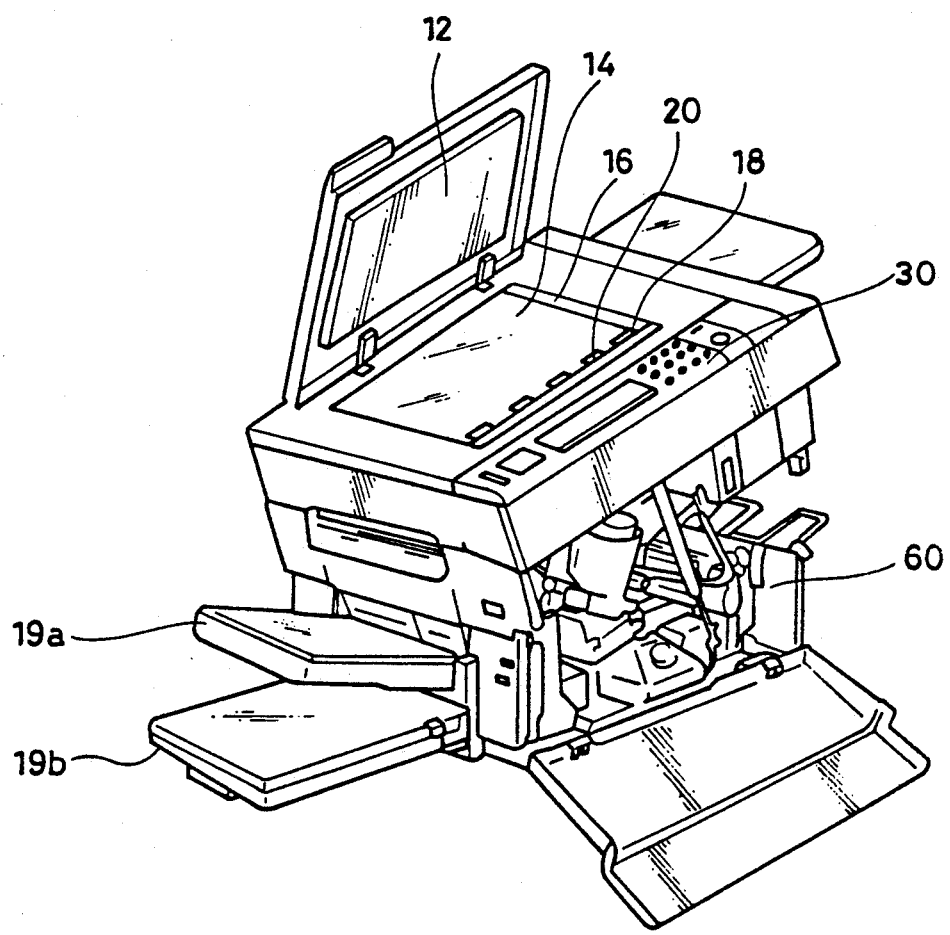
FIG. 3 is an exploded perspective view centered on the platen glass of the copying machine of FIG. 1.

FIG. 3 is an exploded perspective view of the copying machine of FIG. 1 centered on the platen glass. Referring to the figure, an original width scale 16 for measuring the width of the original is arranged at an end portion of the platen glass 14. Column skip levers 20 are arranged at an end portion of the platen glass 14 on the side of the operation panel. An original cover 12 is attached to the upper surface of the copying machine by means of hinges for covering placed originals. The column skip levers 20 may be set at arbitrary positions with reference to an original length scale provided on an front portion of the platen glass 14. Two paper feed cassettes 19a and 19b containing papers to be fed are detachably attached to the side surface of the printer portion 60.

Figure 4:
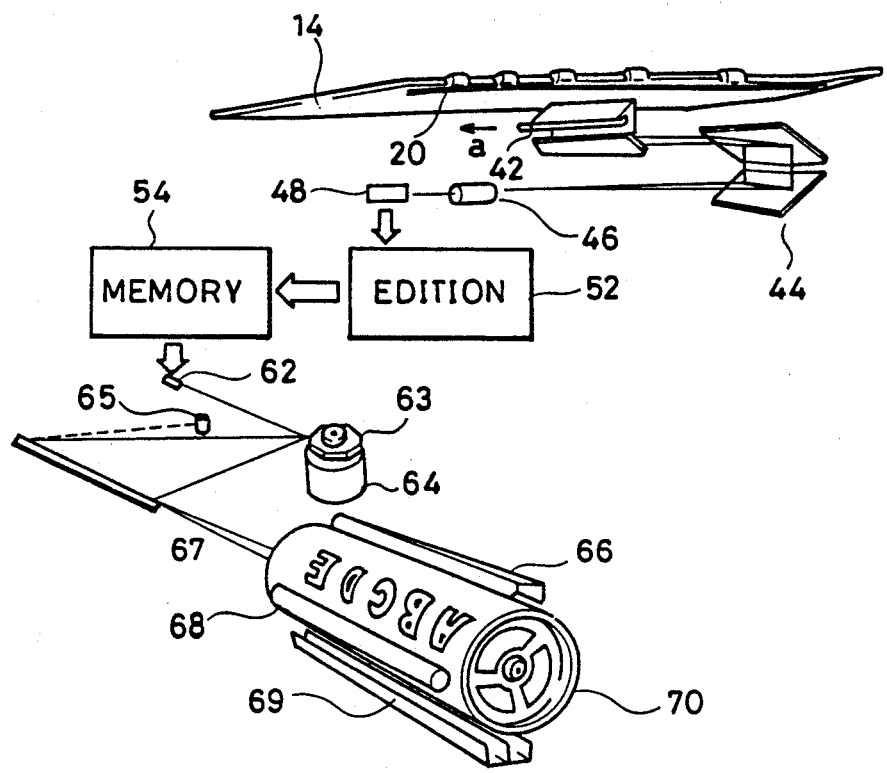
FIG. 4 is a schematic diagram showing the optical system of the copying machine shown in FIGS. 1 and 3.

FIG. 4 illustrates a schematic structure of the image reader portion 40, the image memory portion 50 and the printer portion 60 below the platen glass 14 shown in FIG. 3.

Referring to the figure, images of an original placed on the platen glass 14 are scanned by a scanner 42 in the direction of arrow "a". The direction of arrow "a" will be defined as a subsidiary scanning direction. The light reflected from the scanned original images is condensed and it passes through a mirror 44 and a condenser lens 46 to enter a CCD array 48. The CCD array 48 has a plurality of CCD elements disposed in the direction perpendicular to the subsidiary scanning direction. That direction will be defined as a main scanning direction. The light reflected from the original images is successively read by each CCD element of the CCD array 48. The output data read by the CCD 48 are edited by an editing portion 52 carrying out editing operation such as deletion, change of magnification rate and so on. The edited output data are inputted to a page memory (bit map memory) 54 to be stored therein. The image data stored in the memory 54 are outputted as laser pulses through a laser diode 62. The laser pulses are reflected by a polygon mirror 63 whose rotation controlled by a driving motor 64 to form latent electrostatic images on a photoreceptor 70, with a sensor 65 detecting a start position of scanning being a reference. The photoreceptor 70 is charged to have a prescribed potential by means of a charging portion 66 in advance. The latent electrostatic images formed by the laser pulses are developed in a developing portion 68 and transferred onto a prescribed fed paper in a transferring portion 69.

Figure 5:
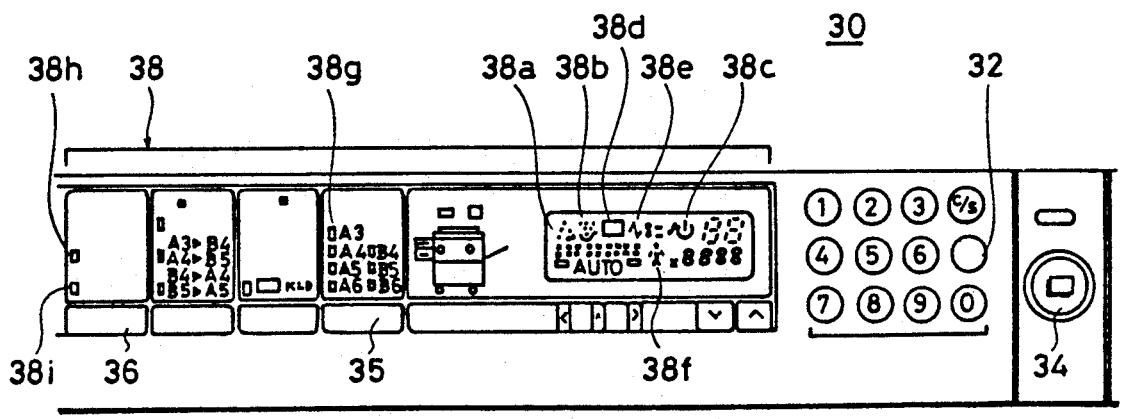
FIG. 5 is a plan view of an operation panel arranged on the upper surface of the machine of FIG. 1.

FIG. 5 is a plan view of the operation panel 30 shown in FIG. 1 which comprises an input key portion having buttons and key input portions, and a display portion. Both of the portions are the same as those of a common copying machine. In the input key portion arranged are: a reduction button; an equal scale magnification button; a paper selecting button 35; a paper feed inlet button; an exposure adjusting button; an exposure selecting button; a magnification rate correcting button; a numerical value setting button; a printing button 34; an all-reset button; and a clear stop button. A column skip mode button 36 and an original illumination button 32 are further provided.

The display portion 38 comprises: a paper inlet display; a paper size display 38g; a copy number display; a display 38h of automatic paper size selection mode; a display 38i of manual paper size selection mode; a magnification rate display; and a display of exposure. Further provided are a toner empty display 38a; a display 38b indicating that a withdrawn toner bottle is full; a display 38c indicating that the machine is not being heated to a prescribed temperature; a display 38d indicating paper empty; a display 38e indicating a jam; and a display 38f indicating an accident.

In accordance with one embodiment of the present invention, only the image data read by the image reading portion 40 in the range designated by the levers 20 are inputted into the memory 54. Thereafter, the image data are outputted from the memory 54 to the printer portion 60. Consequently, a copy is provided in which only the necessary portions of the images are copied, for example a copy of one's resident register or one's family register.

Figure 6:
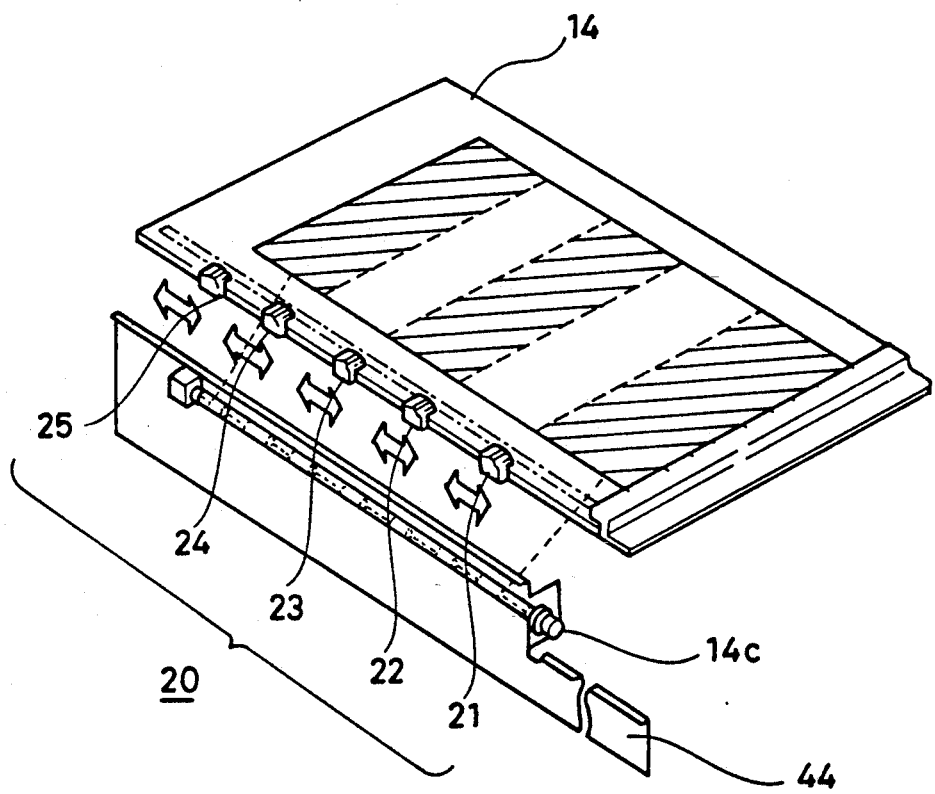
FIG. 6 is a perspective view showing the arrangement of the platen glass and column skip levers of FIG. 1.

The designation of the area to be edited is carried out by sliding five column skip levers 21 to 25 provided on the platen glass as shown in FIG. 6. Referring to the figure, areas between the levers 21 and 22, the levers 23 and 24 and an area behind the lever 25 are invalid areas. The area in front of the lever 21 and the areas between the levers 22 and 23 and the levers 24 and 25 (hatched areas) are copy areas. Therefore, the desired image areas are copied continuously, as shown in FIG. 7.

In FIG. 6, a sub light source 14c and a reflecting plate 44 for the sub light source 14c provided along the lower side of the levers 21 to 25 are shown. The sub light source 14c is turned on for a prescribed time period by pressing an original illumination button 32 when the column skip edition is to be carried out, so that the images of the original D1 can be seen through the rear surface, thereby facilitating setting of the levers 21 to 25.

FIGS. 8 and 9 are plan view and bottom view, respectively, showing the column skip lever 20 which is enlarged for convenience, and FIG. 10 is a cross sectional perspective view showing the cross section of the central portion of the lever 20.

The lever 20 comprises a lever body 41 including an upper piece 41a, a central piece 41b and a lower piece 41c which is shorter than the upper piece 41, and a black marker 45 fixed to an end portion of the lower piece 41c.

The lever body 41 sandwiches the platen glass 12 by means of the upper piece 41a and the lower piece 41c and it is movable along an end portion in that state. An arrow 43 for facilitating exact positioning and convex stripes for facilitating easy movement of the lever 20 by one's finger are formed on the upper surface of the upper piece 41a.

A white reflecting tape 14a is applied at a portion corresponding to the track of the marker 45 on the lower surface of the platen glass 14. The positions of the reflecting tape 14a and of the marker 45 in the scanning direction which are the same as the reading position of the original D1 are irradiated by the halogen lamp during scanning of the scanner 42. Therefore, when the scanner 41 reaches the position of the marker 45, the light reflected therefrom is considerably reduced. By detecting the change of the reflected light, the positions of the levers 21 to 25 can be detected.

A space 20d is provided in order to prevent contact between the white tape 14a and the marker 45. This is in order to prevent erroneous detection caused by a flaw on the white tape 14a and to prevent erroneous detection caused by dust attracted on the tape by static electricity derived from the contact.

In this manner, during main scanning of the CCD, sub scanning (scanner) is carried out reading the white tape portion, and when an edge of the black marker 45 is detected during the sub scanning, the sub scanning is carried out for a prescribed width and thereafter writing of data to the memory is stopped. Thereafter, when an edge of a second black marker is detected and the sub scanning is carried out for the said prescribed width, the writing of the data into the memory is started again.

Figure 11:
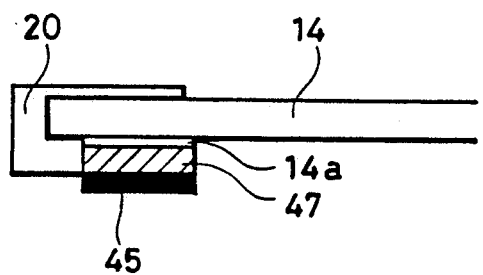
FIG. 11 shows another example of the column skip lever of FIG. 6.

FIG. 11 shows another example of the column skip lever. Referring to the figure, a buffer member 47 is interposed between the white tape 14a and the marker 45. The member 47 is formed of a felt or a conductive sponge having a function of eliminating charges. A paint may be used instead of the white tape 14a. Any other color providing distinctive output difference from the marker during image scanning can be used.

Figure 12:
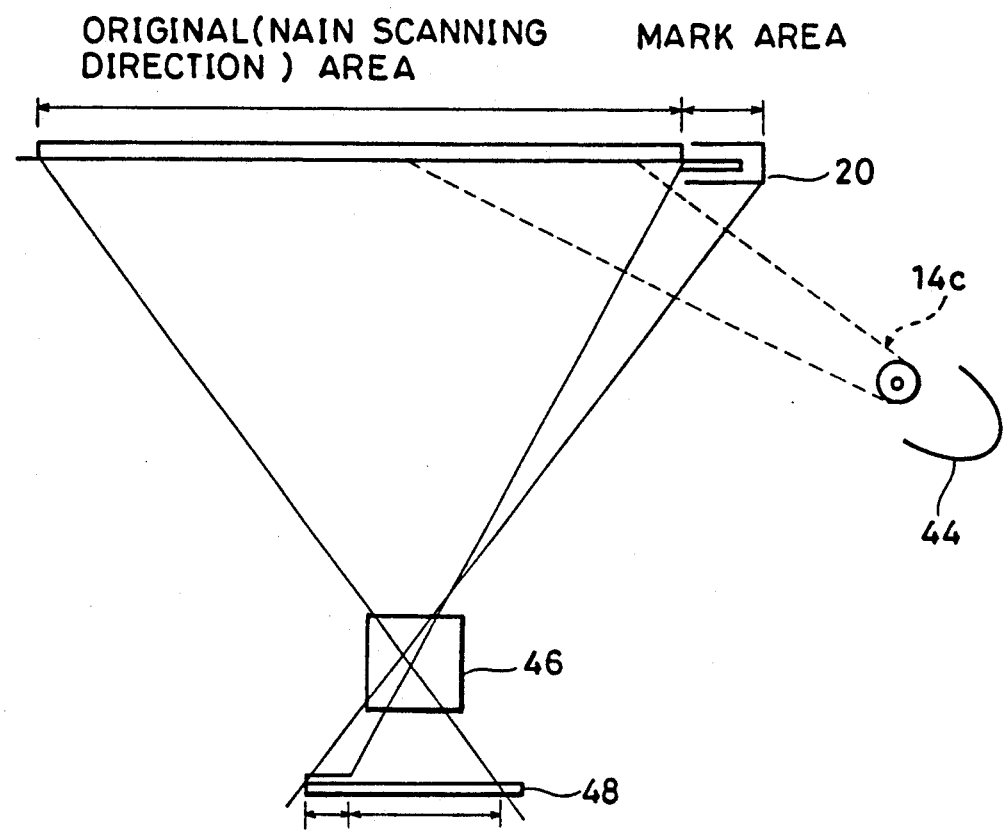
FIG. 12 is a schematic diagram showing a structure of one embodiment of the present invention including a sub light source or an original illuminating lamp.
Figure 13:
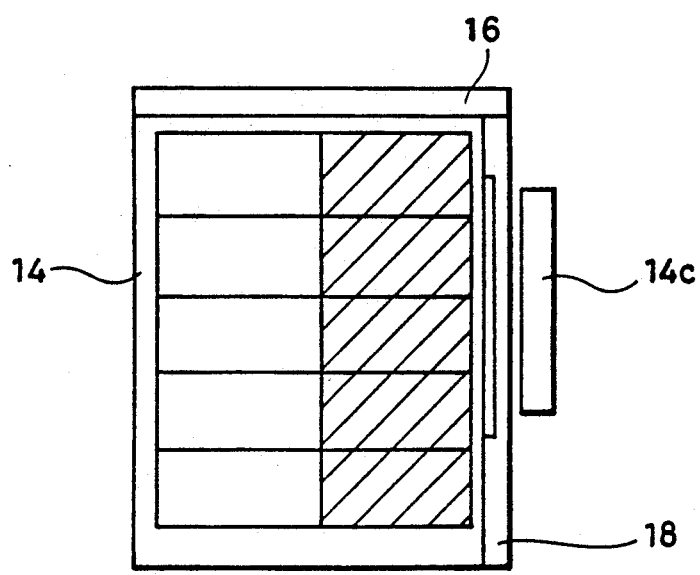
FIG. 13 is a plan view of an original irradiated by the sub light source of FIG. 12.

FIG. 12 is a schematic diagram showing a structure including a sub light source or an original illuminating lamp and FIG. 13 illustrates an original irradiated by the sub light source. By using a sub light source 14c as shown in the figure in addition to a light source, not shown, for exposing and scanning the original to irradiate not necessarily the entire surface of the original but a portion of the original near the moving range of the lever 20 (hatched portion) the contents of the original can be seen through, so that the moving operation of the lever 20 can be facilitated.

Figure 14:
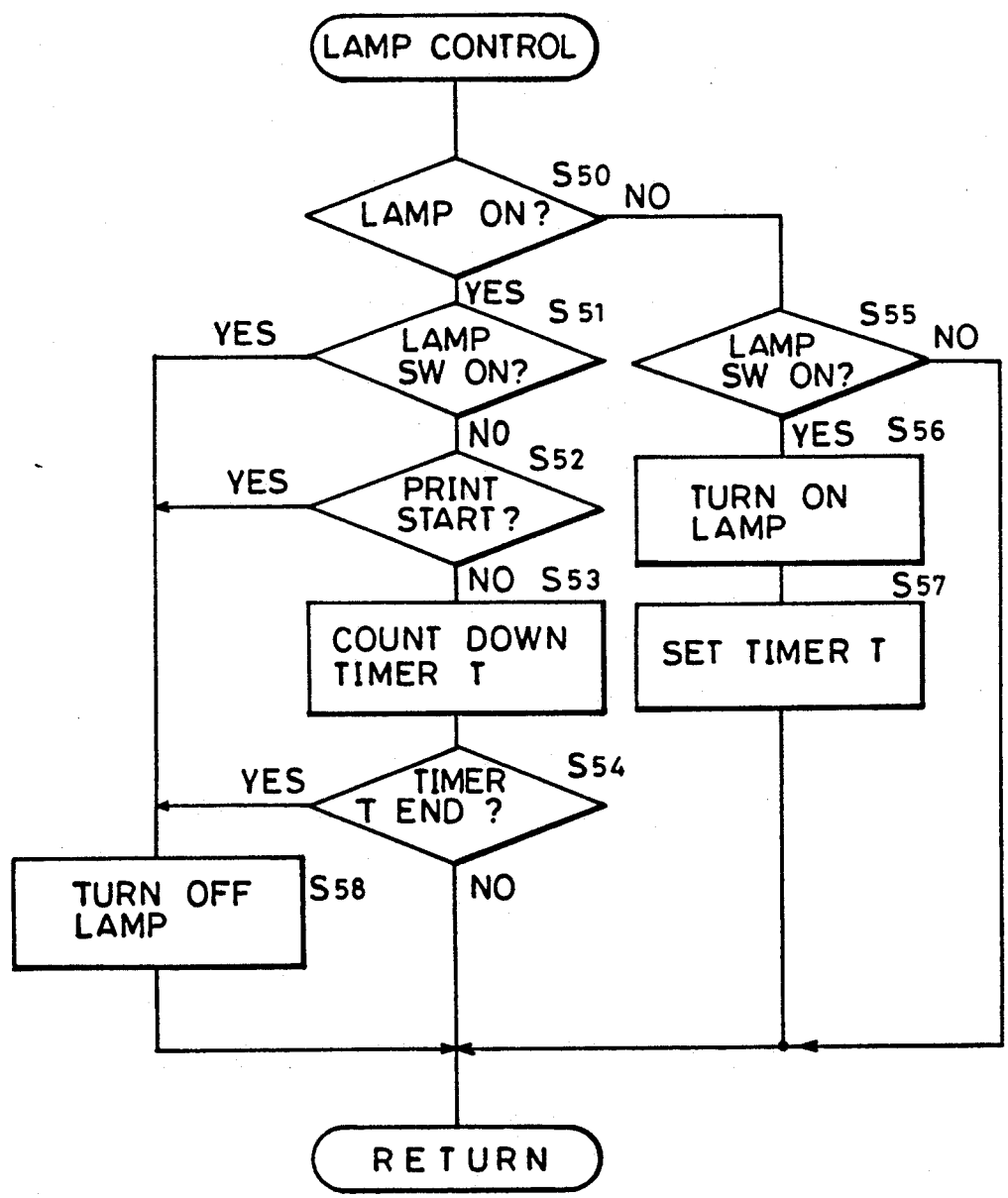
FIG. 14 is a flow chart of controlling the operation of the sub light source shown in FIG. 12.

FIG. 14 is a flow chart showing an example of control of the operation of the sub light source.

Referring to the flow chart, when the sub light source 14c or the lamp is OFF (NO in S50), and an original illuminating button 32 on the operation panel 30 shown in FIG. 5 is turned ON (YES in S55), then the lamp is turned on (S56) and a timer T is set (S57). When the lever 20 is operated and if the lamp is still ON (YES in S50) at that time, then the button 32 is pressed to turn the lamp off(S58). Alternatively, when the printing operation is started by a button 34 while the lamp is ON (YES in S52), the lamp is turned OFF. While the lamp is ON, the count of the timer T is decremented (S53), and the lamp is turned off when the counting of the timer T is ended (YES in S54).

The timer and the control means such as described above are incorporated in the system controller 10 and the image reader portion 40 shown in FIG. 2.

The opening and closing of the original cover 12 may be detected in order to automatically turn on the sub light source 14c when the cover is opened and to automatically turn off the light source 14c when it is closed.

Figure 15:
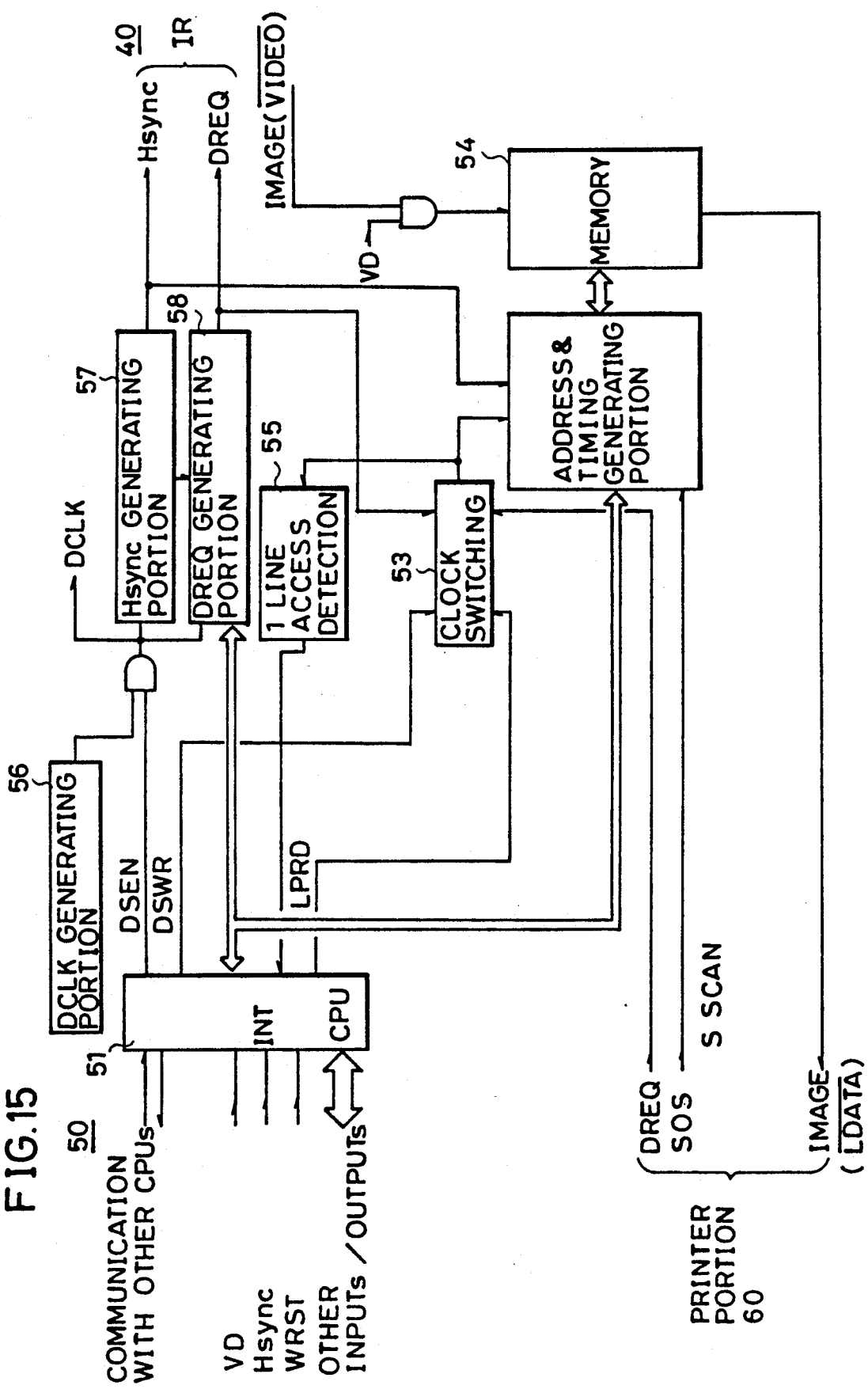
FIG. 15 is a schematic block diagram showing the flow of control signals of the image memory portion and the portion generating the control signals of FIG. 1.

FIG. 15 is a schematic block diagram showing control signals of the image memory portion 50 of FIG. 1 and a portion generating these signals. A CPU 51 controls the memory portion and communicates with respective CPUs of the system controller, the image reader portion and the printer portion.

Now, a DCLK generating portion 56 is a reference clock generating portion for generating respective control signals to the image reader portion (IR) 40. A Hsync generating portion 57 is a portion for generating Hsync signals (vertical synchronizing signals) and generates Hsync signals whose number corresponds to the paper length in the subsidary scanning direction.

A DREQ generating portion is a portion for generating image data request signals to the image reader portion 40 and it generates DREQ signals whose number corresponds to the paper length in the main scanning direction.

A clock switching portion 53 switches clock in writing and reading to and from the bit map memory 54.

A 1 (one) line access detecting portion 55 detects that writing or reading of 1 line is being carried out. It is a gate circuit for inputting dummy data to a remaining portion of 1 line when a memory write instructing signal VD becomes inactive level. In the memory, "0" level is assigned to white and "1" level is assigned to black.

Figure 16:
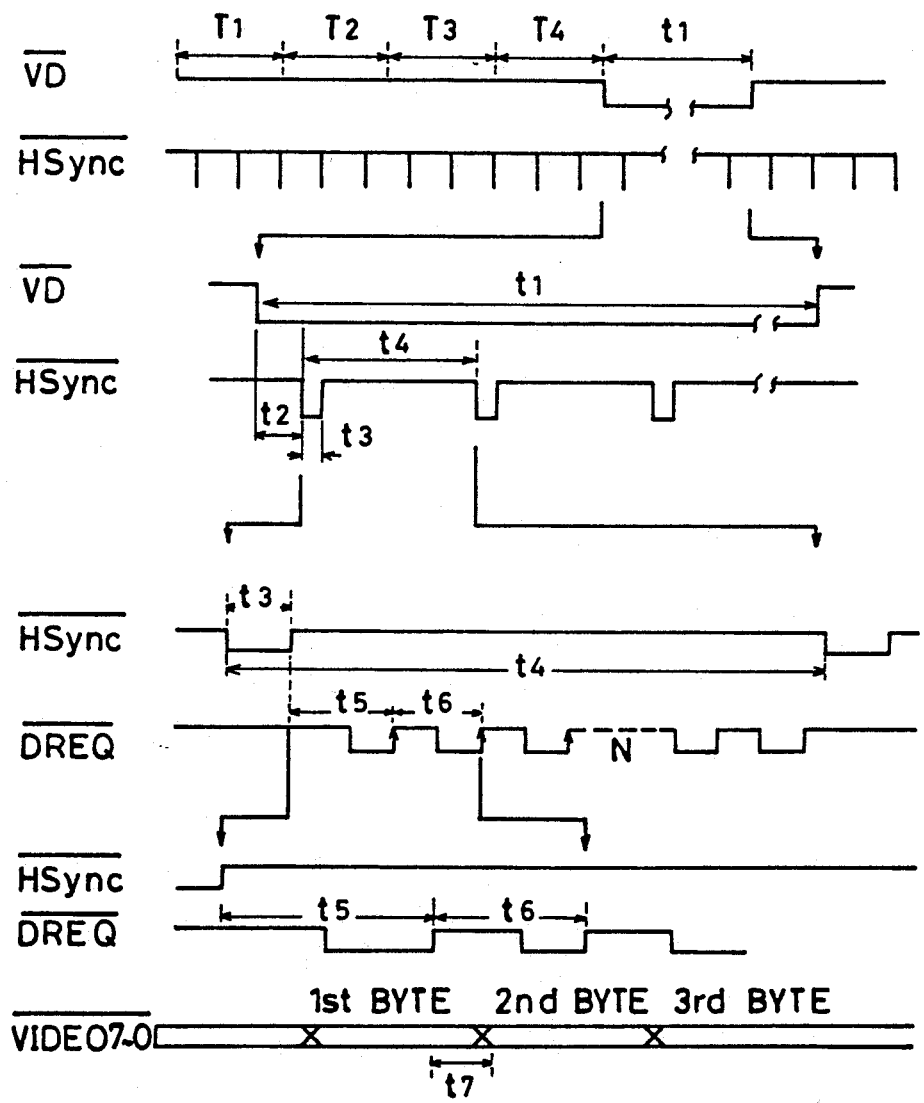
FIG. 16 is a time chart showing generation timings of the various signals shown in FIG. 15.

FIG. 16 is a time chart showing timing of generation of respective signals shown in FIG. 15. In accordance with one embodiment of the present invention, the lever 20 is moved along the original vertical scale 18 to be set at an appropriate position. Signal VD indicating a valid area of the original images detected by an intersection of the position of the lever 20 and the white tape 14a provided along the lower surface of the platen glass 14 changes in accordance with an original vertical scale sampling process.

Figure 17:
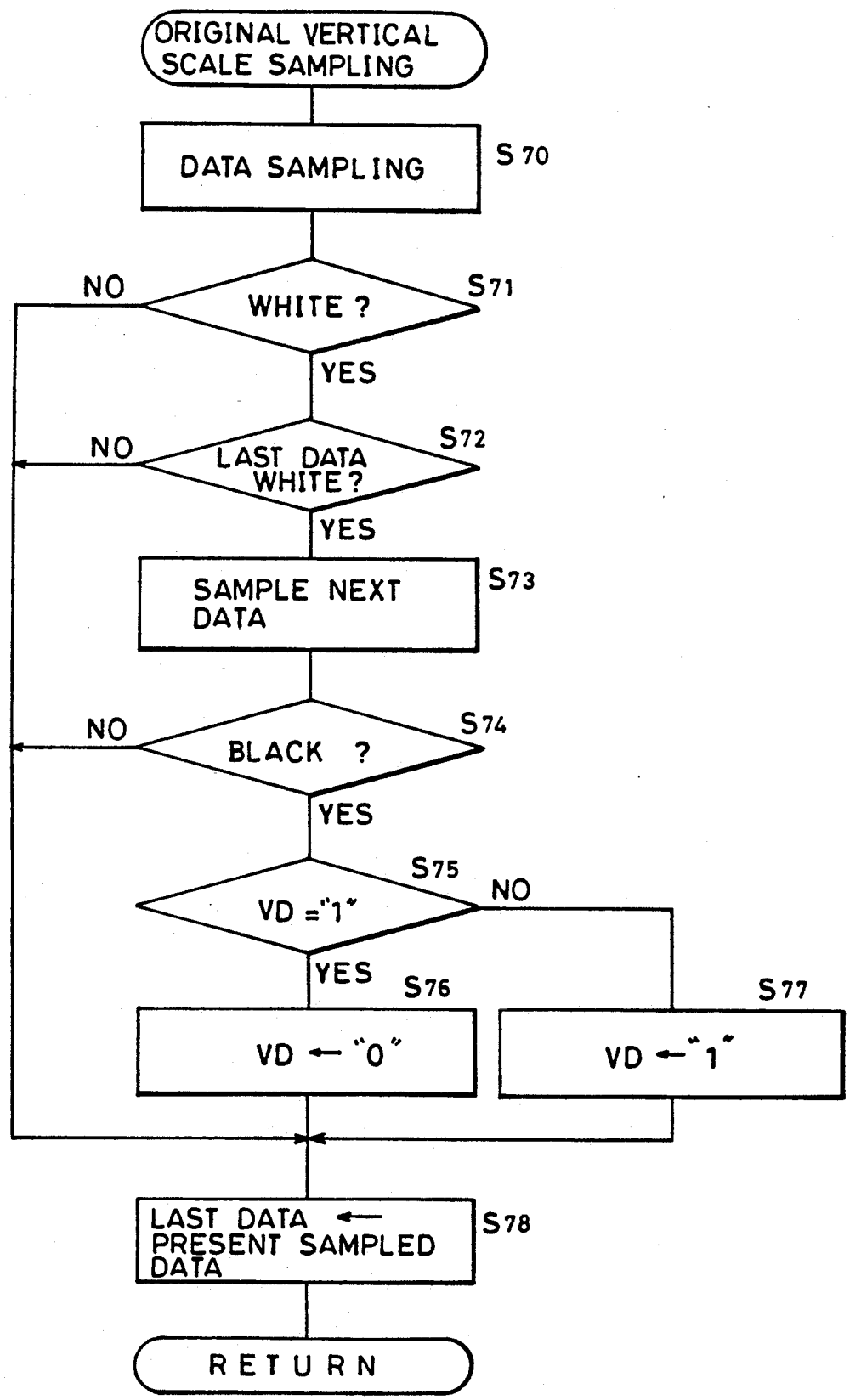
FIG. 17 showing contents of an original vertical scale sampling process in accordance with one embodiment of the present invention.

FIG. 17 is a flow chart showing the contents of the original vertical scale sampling process. The original vertical scale or the white tape is in a reading area of the CCD and out of the valid original area. In scanning, the original as well as the original vertical scale (white portion) are read. The original area signal VD in the sub scanning direction is inverted every time a change from white to black or black to white is detected.

First, in the step S70, the original vertical scale portion is read and the read color is sampled. Whether the read color is white or not is checked in the step S71. When the read color is not white, the flow proceeds to the step S78 and the last data is replaced with the present sampling data. When the read color is white, whether the data read last time was white or not is checked in S72. If the last data was not white, that is, the last data was black, then the last data is replaced with the present sampling data, that is, white. If the last data was white, then the next data is sampled in the step S73. Whether the sampled data is black or not is checked in the step S74. If it is not black, namely, if the sampled data is white, the flow proceeds to the step S78, and white data is maintained as the last data. If the sampled data is black (YES in step S74), whether the signal VD is "1" or not is checked in the step S75. If the signal VD is "1", the signal VD is replaced with "0" in the step S76, and in the step S78, the last data, that is, white, is replaced with the present sampling data, that is, black. If the signal VD is not "1" in step S75, the signal VD is set at "1" in the step S77, and the flow proceeds to the step S78 to rewrite data in the same manner as described above. In this manner, every time the original vertical scale portion is read by the CCD, the read data is compared with the last data to determine the value of the signal VD.

In the present embodiment, the image reader portion is structured such that the timing for reading the original image and the timing for transferring the read image data are applied externally, as will be described later. Therefore, when the lever in the reading area of the CCD and out of the valid original are is to be detected simultaneously with the reading of the original and to switch the valid/invalid of the image information based on the result, sometimes the switching is required amid the processing of image information of the corresponding 1 line, dependent on the time required for the process for detection.

In other words, the valid image area signal VD is not synchronized with the transfer of the image data for 1 line, so that the generation of the signal may possibly be stopped during 1 line. In view of the foregoing, dummy data are employed, as will be described later.

Figure 18:
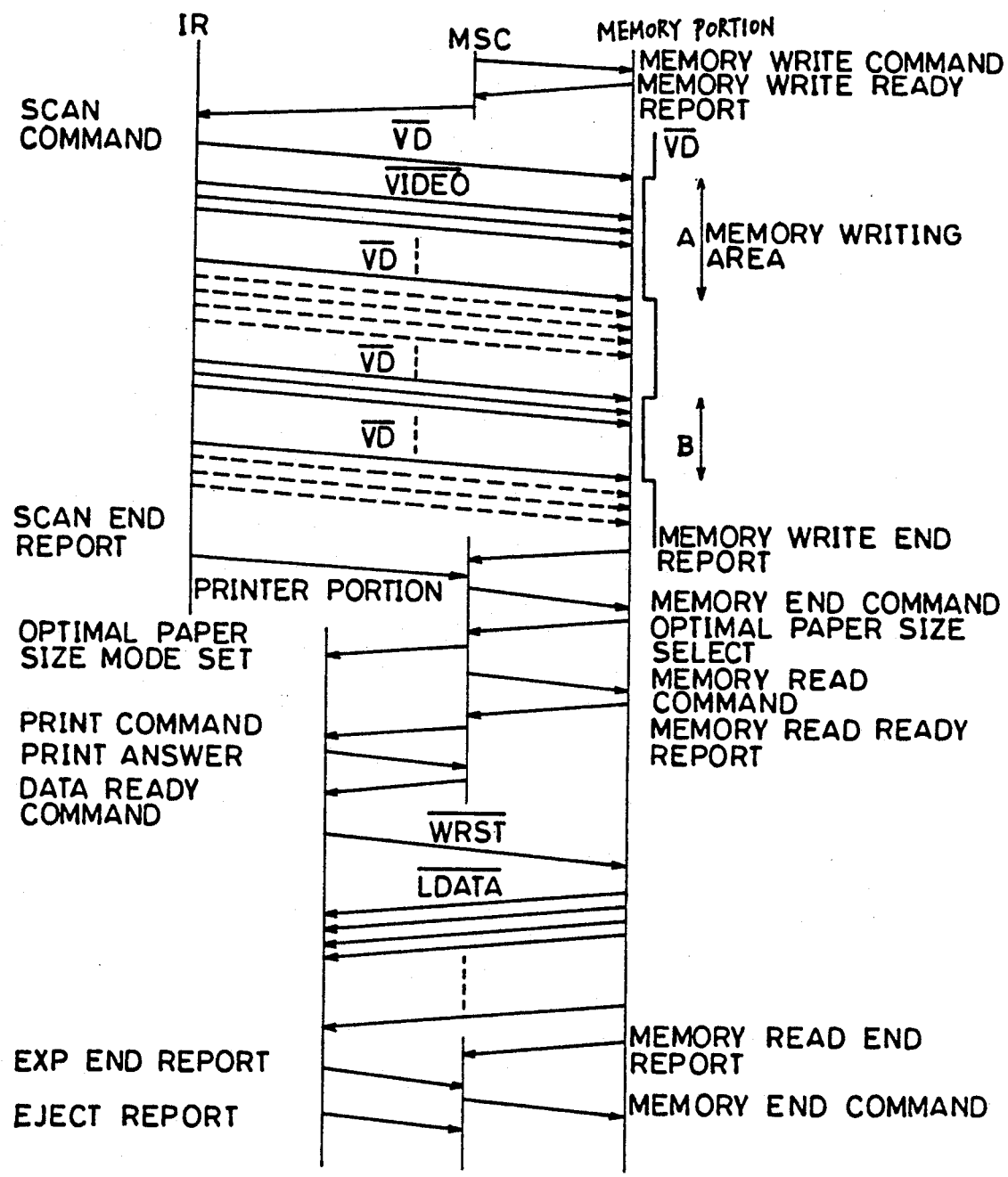
FIG. 18 illustrates signal timings in an editing operating mode in accordance with one embodiment of the present invention.

FIG. 18 shows examples of the timings for scanning and reading of the original image, writing to the memory and print output in accordance with one embodiment of the present invention.

All of these operations are carried out by exchanging commands and signals as shown in the figure.

First, by a system controller (MSC) 10 governing the entire system, a "MEMORY WRITE command" is transmitted to a memory CPU 51 in the memory portion 50 for writing.

The memory portion 50 carries out initialization of respective portions such as the bit map memory 54 to be ready for the writing operation, in response to the command.

When the initialization is completed, a "MEMORY WRITE READY report" is transmitted to the system controller (MSC) 10, and the memory portion is kept in a waiting state until image data are outputted from the image reader portion (IR) 40.

The MSC 10 transmits a SCAN command to the IR 40, and the IR 40 starts the scanning of the original.

If the valid area signal (VD signal) from the image reader portion 40 becomes an active level, the memory portion 50 starts writing of the image data. The writing operation is continued until a prescribed amount of data corresponding to a prescribed memory capacitance are written or until a "MEMORY END command" is received.

However, if the VD signal becomes inactive level (indicating that the image information is invalid) during the writing operation, the writing to the bit map memory 54 is stopped. When the VD signal becomes active level again (indicating that the image information is valid), the writing operation is started again. However, if the VD signal becomes inactive during writing of data of 1 line, dummy data are written in the remainder of the corresponding line, and the interrupting sequence starts when the writing of the line is completed.

Thereafter, the memory portion 50 transmits a "MEMORY WRITE END report" to the system controller 10 at a time of completion of writing of the prescribed amount of data or at the time of receiving the "MEMORY END command", which is earlier, to finish the writing operation. When the scanning of the prescribed amount is completed, the IR 40 transmits a SCAN END command to the MSC 10.

When the SCAN END command is received by the MSC 10, there will be no output of the image data, so that the MSC 10 transmits a MEMORY END command indicating the end of the employed memory capacitance to the memory portion 50. After the MEMORY END command is received by the memory portion 50, the memory portion 50 selects the most suitable paper size to print out the image data and transmits the selected suitable paper size to the MSC 10. Upon reception of this signal, the MSC 10 transmits an optimal paper size mode set command to the printer portion 60 for setting a mode for selecting the optimal paper size.

Meanwhile, when the image data written in the bit map memory 54 are to be transmitted to the printer portion 60, a "MEMORY READ command" is transmitted from the system controller 10. The memory portion 50 prepares for the reading operation in response to the command and transmits a "MEMORY READ READY report", and the memory portion waits for the control signal from the printer portion 60. After the exchange of commands indicating instruction of printing between the MSC 10 and the printer portion 60 is finished, a signal (WRST signal) indicating the writing area of the printer portion, SOS signal and DREQ signal are transmitted from the printer portion 60. The memory portion transmits the image data of L data to the printer portion 60 in response to these signals.

Thereafter, the memory portion transmits a "MEMORY READ END report" to the MSC 10 at the time of the end of reading of the prescribed memory capacitance or the time of receipt of the "MEMORY END command", which is earlier, to finish the reading operation.

The printer portion 60 develops the image data L data successively transmitted from the memory portion 50 on a selected paper. At the end of the process of the image data, the printer portion 60 transmits an EXP END report command indicating the end of development to the MSC 10. The printer portion 60 further transmits an EJECT report command indicating ejection of the developed paper to the MSC 10. Upon receipt of the EXP END command, the MSC 10 transmits the MEMORY END command to the memory portion 50.

Figure 19:
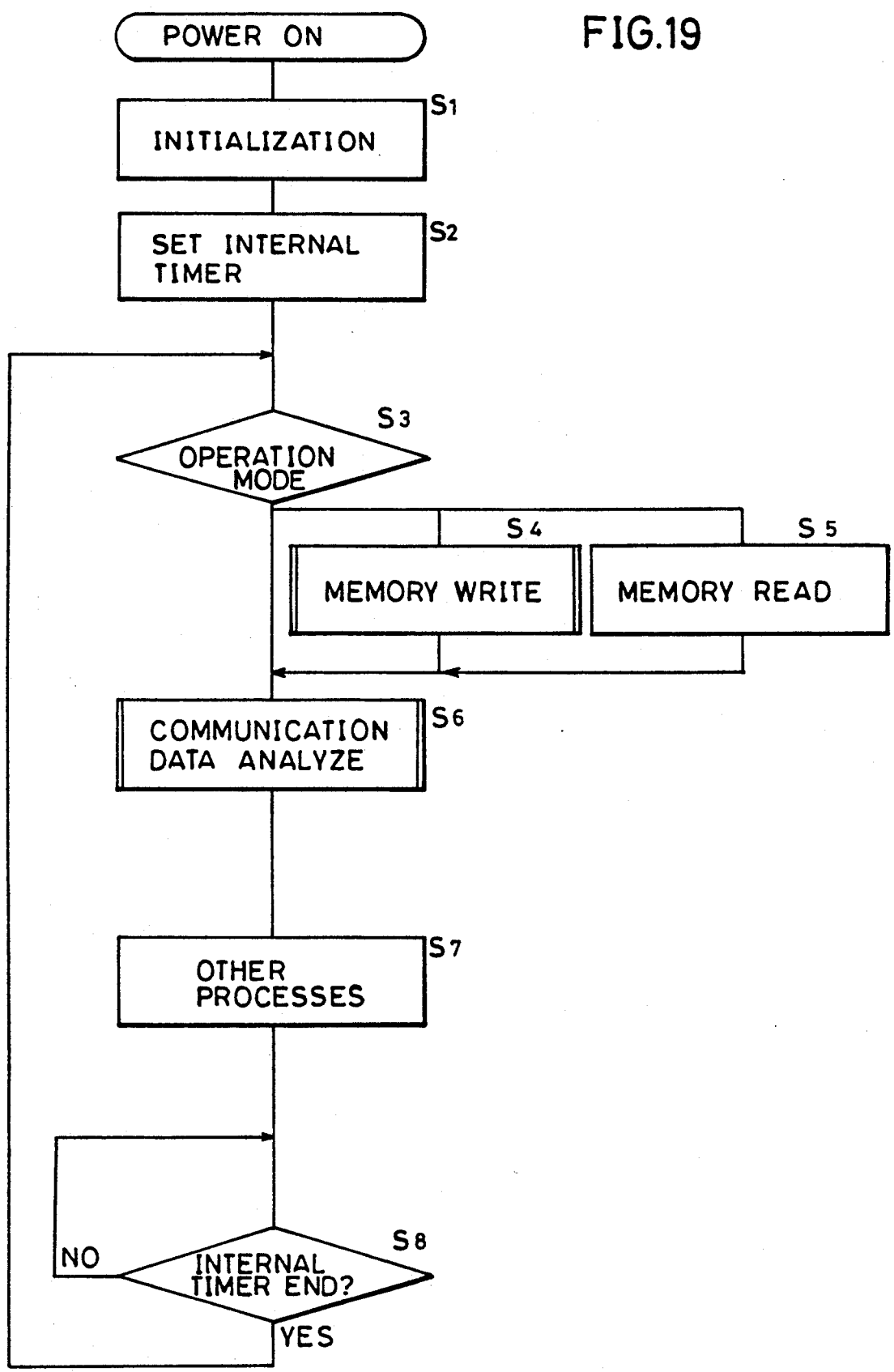
FIG. 19 is a flow chart showing a main routine of a CPU in the memory portion of the copying machine in accordance with one embodiment of the present invention.

FIG. 19 shows a main routine of the CPU 51 of the memory portion of a digital copying machine in accordance with one embodiment of the present invention.

First, when the power is turned on, the inner portion are initialized (step S1) and an internal timer is set (step S2). By doing so, the following process is carried out at every prescribed time period.

Thereafter, the operation mode is checked (step S3), and the flow branches to the standby state, memory writing (step S4) and memory reading (step S5).

Figure 20:
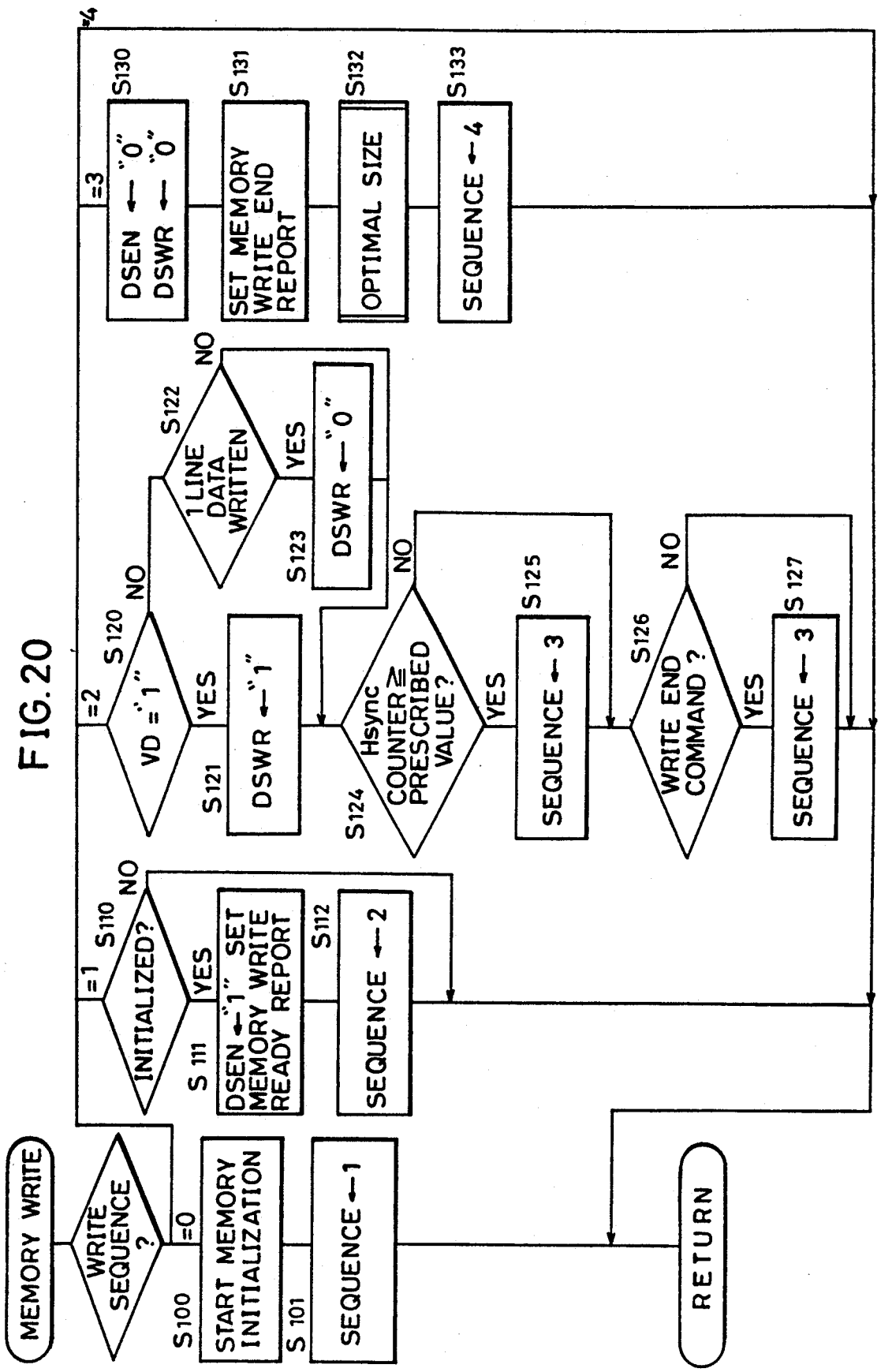
FIG. 20 is a flow chart showing the contents of the memory writing routine of FIG. 19.

The contents of the memory writing process (step S4) will be described later (see FIG. 20).

The transmitted data are analyzed (step S6), and the operation corresponding to the instruction from the MSC 10 is carried out. The details of the contents will be described later (see FIG. 23). In the next step S7, communication, input and other processes are carried out, and when the end of the operation of the internal timer is detected (step S8), the flow returns to the step S3 to repeat the above description process.

An example of the memory write process will be described with reference to the flow chart of FIG. 20.

When the content of the writing sequence is checked and determined to be "0", a process for initializing the bit map memory 54 is started in the step S100, and the writing sequence is set at "1" (step S101).

When the writing sequence is 1, a ready report is transmitted when the initialization of the bit map memory 54 is completed.

More specifically, whether the initialization is completed or not is determined in the step S110, and if not (NO in S110), the flow bypasses the following processes to return to the main routine. If the initialization has been completed, the flow proceeds to the step S111 in which a "DSEN (DOCUMENT SCAN ENABLE) signal" is set at "1" in order to generate various control signals to the image reader portion 40 and a "MEMORY WRITE READY report" is set to be transmitted. Thereafter the writing sequence is set at "2" (step S112).

When the writing sequence is "2", a process when the VD signal becomes active level or inactive level during the writing operation and the process for detecting the completion of the writing operation are carried out. More specifically, the VD signal is checked in the step S120 and if it is "1" (active level), it means that the image data are of the valid area, so that a "DSWR (DOCUMENT SCAN WRITE) signal" is set at "1" (step S121) to generate timing signals and address of the bit map memory in order to write the data to the bit map memory 54.

Meanwhile, if the VD signal is "0" (inactive level), whether the data of 1 line is being written or not is checked in the step S122. If the writing of 1 line has been completed, the DSWR signal is set at "0" to interrupt the writing to the bit map memory (step S123).

On the contrary, if the data of 1 line is being written (NO in S122), the flow bypasses the step S123, and the writing to the bit map memory is continued. Referring to the input signal to the memory 54 of FIG. 15, the image data and the VD signal are written into the bit map memory through an AND circuit. In this case, "white" ("0" level) is written as the dummy data. Thereafter, if the writing of 1 line is completed (YES in S122), the DSWR signal becomes "0" in the step S123, so that the writing is stopped.

Thereafter, in the step S124, whether writing into the prescribed memory capacitance is completed or not is determined. Namely, the number of lines in the sub scanning direction is counted by a Hsync counter in the CPU 51, and therefore the above mentioned determination can be effected by checking whether the value of the counter reaches the value corresponding to the previously received paper size or not. If the value is no less than the prescribed value (YES in S124), the writing sequence is set at "3" (step S125).

In the succeeding step S126, whether the end command is received from the MSC 10 or not is determined. If it is received, the writing sequence is set at "3" in the step S127, so that the operation enters the mode for ending process.

When the writing sequence is set at 3, the respective control signals and reports are processed for completing the writing.

In the step S130, the DSWR signal and the DSEN signal are both set at "0" to terminate writing to the bit map memory. In the step S131, data for transmitting the "MEMORY WRITE END report" to the MSC 10 are set. In the step S132, the most suitable paper size is selected in accordance with the value of the Hsync counter.

Briefly stated, when an original having the size of A3T (A3 longitudinal in the sub scanning direction) is scanned and read and the Hsync indicates that the valid image written in the bit map memory corresponds to the A4Y size (A4 longitudinal in the direction orthogonal to the sub scanning direction) or less as the result of the column skip editing through utilization of the levers, the image output should be carried out on a paper having the size of A4Y and not A3T. Therefore, the paper size corresponding to the counter value of the actually written Hsync is selected as the most suitable size to be transmitted to the MSC 10. The details of the selection of the most suitable size will be described later (see FIG. 21).

In the step S133, the writing sequence is set at "4" and the memory writing routine is bypassed hereinafter until the sequence is initialized.

Figure 21:
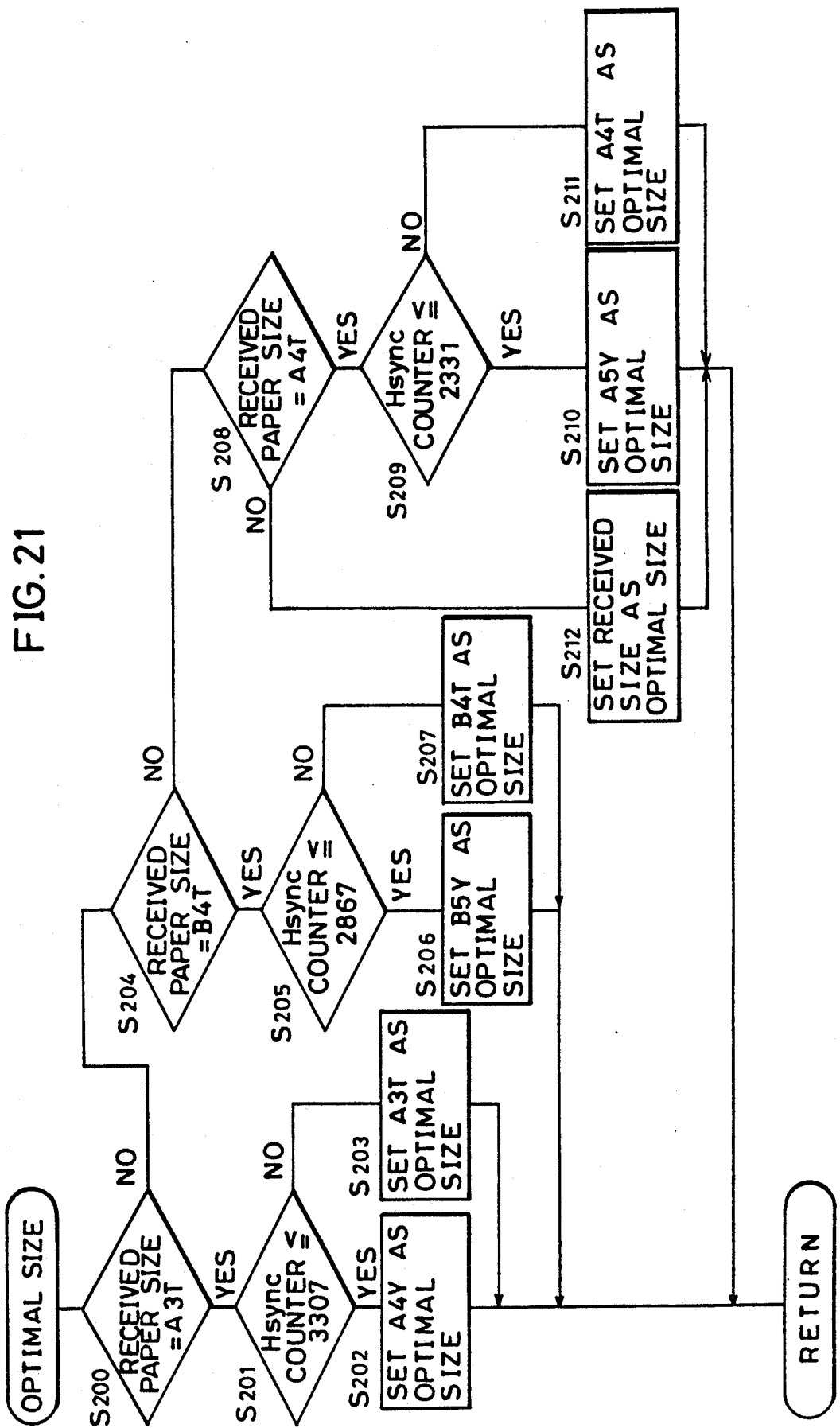
FIG. 21 is a flow chart showing the contents of the optimal size detecting routine of FIG. 20.

FIG. 21 is a flow chart showing the contents of the optimal size detecting routine. When the amount of the data written in the bit map memory requires a paper which is the same size in the main scanning direction but shorter in the sub scanning direction than the presently received paper size, a process for selecting a paper of the most suitable size is shown as an example.

When it is determined that the received paper size is A3T in the step S200, then the amount of data presently written in the bit map memory, that is, the value of the Hsync counter is checked in the next step S201. If the amount of data written in the bit map memory corresponds to the A4Y size or shorter (210 mm corresponds to 3308 lines in 400 dpi), then A4Y is set as the most suitable size in the step S202. On the contrary, if the amount is larger than A4Y, then A3T is set as the most suitable size (step S203).

The similar process is carried out for B4T size in the steps S204 to S207 and for A4T in the steps S208 to S211. If the received paper size is not the above mentioned size A3T, B4T or A4T (NO in all of the steps S200, S204 and S208), the output is provided on a paper of the received paper size directly in order to simplify the process (step S212).

Figure 22:
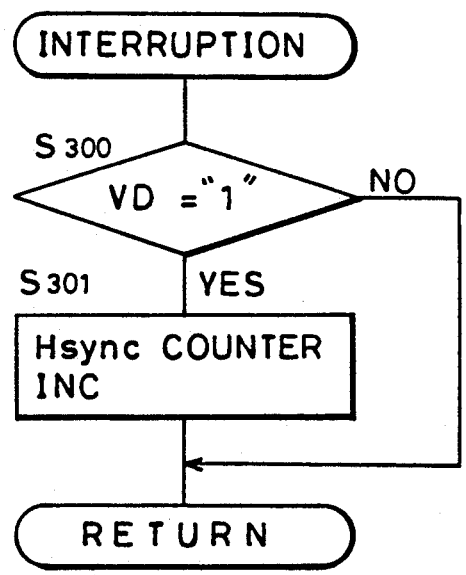
FIG. 22 is a flow chart showing the contents of interrupting process in accordance with one embodiment of the present in invention.

FIG. 22 is a flow chart showing the content of the interrupting process in accordance with one embodiment of the present invention. The interrupting process is carried out every time the signal VD is changed by the sampling described with reference to FIG. 17. Here, the number of Hsync which is the synchronous signal in the sub scanning direction is counted. Namely, a process for measuring the memory capacitance presently written in the bit map memory is carried out.

If the valid area signal (VD signal) is "1" in the step S300, the Hsync counter is incremented in the step S301 every time the Hsync is generated.

Figure 23:
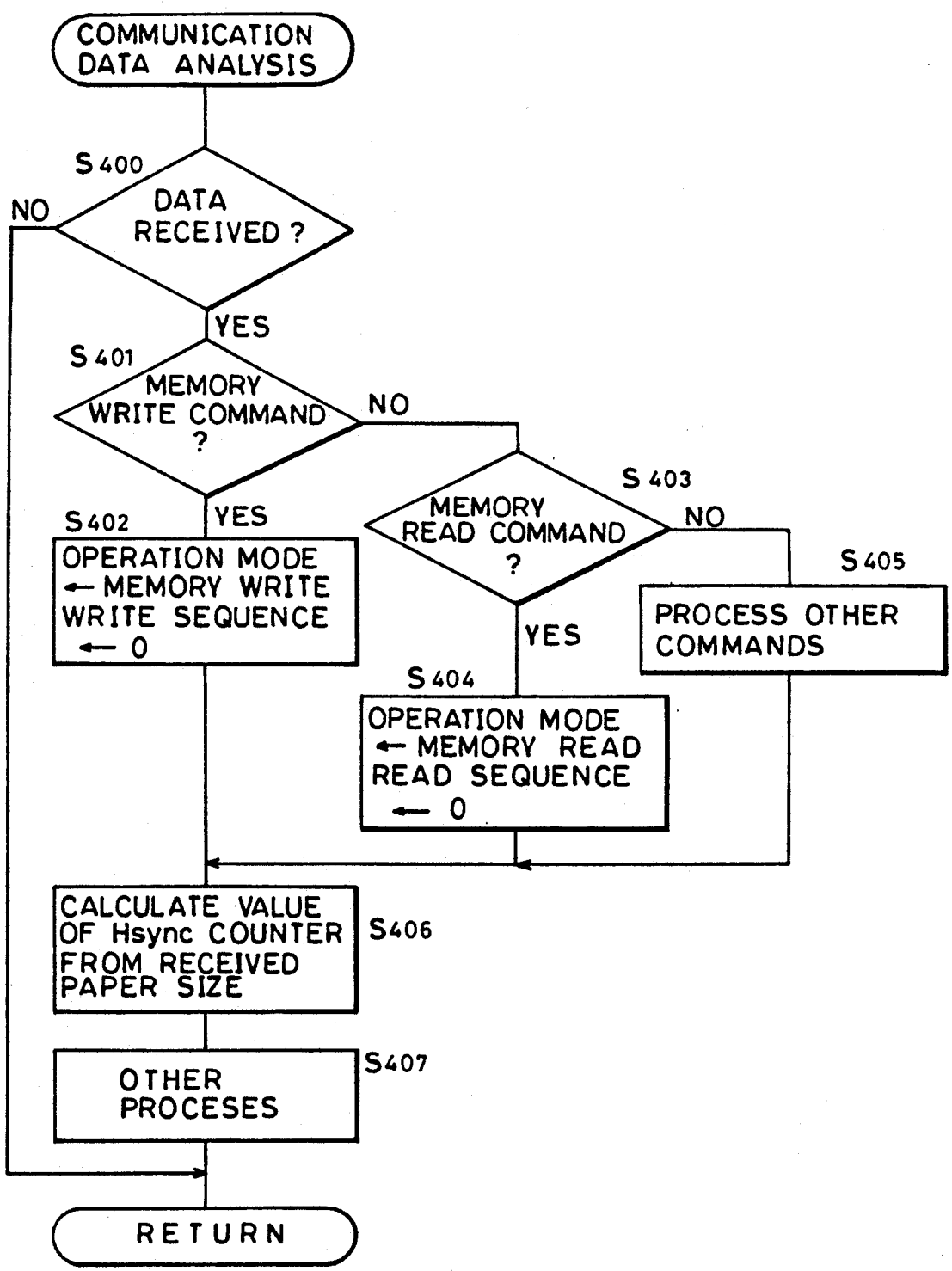
FIG. 23 is a flow chart showing the contents of the communication data analyzing routine shown in FIG. 19.

FIG. 23 is a flow chart showing the contents of the communication data analyzing routine shown in FIG. 19.

In the step S400, if there is no data received, the flow bypasses all of the following processes and returns to the main routine. Otherwise, the flow proceeds to the step S401 to determine whether the data is the "MEMORY WRITE command" for writing or not. If the data is the "MEMORY WRITE command", the flow proceeds to the step S402 to set the operation mode at the "memory write" and to set the writing sequence at "0" to start the writing operation.

If the data is not the "MEMORY WRITE command", the flow proceeds to the step S403 to determine whether the data is the "MEMORY read command" (output mode to the printer portion 60) or not is determined. If the data is "MEMORY READ command", the flow proceeds to the step S404 in which the operation mode is set at "memory read" and the reading sequence is set at "0" to start the reading operation.

If the data is not the "MEMORY READ command", the flow proceeds to the step S405 to carry out processes corresponding to other commands.

After the above described processes, the flow proceeds to the step S406 to calculate the maximum value of the Hsync counter corresponding to the presently received paper size. The calculated value is utilized as the prescribed value in the step S124 of the above described "memory writing" process.

When these processes are completed, the flow proceeds to the step S407 to carry out other processes, and then the flow returns to the main routine.

In a digital copying machine in accordance with one embodiment of the present invention, two or more necessary columns are extracted from the original images, and they are continuously copied even when there are spaces between the necessary columns. The range of such column skip copying is set by the levers 20. Dependent on the set state, the paper to be fed for the copying may be smaller than the original. Therefore, by pressing a column skip button 36 on the operation panel to indicate the automatic paper selection and then by inputting the print switch 34, the control process for automatically selecting the paper to be fed is carried out in accordance with the detection of the key input.

Figure 24:
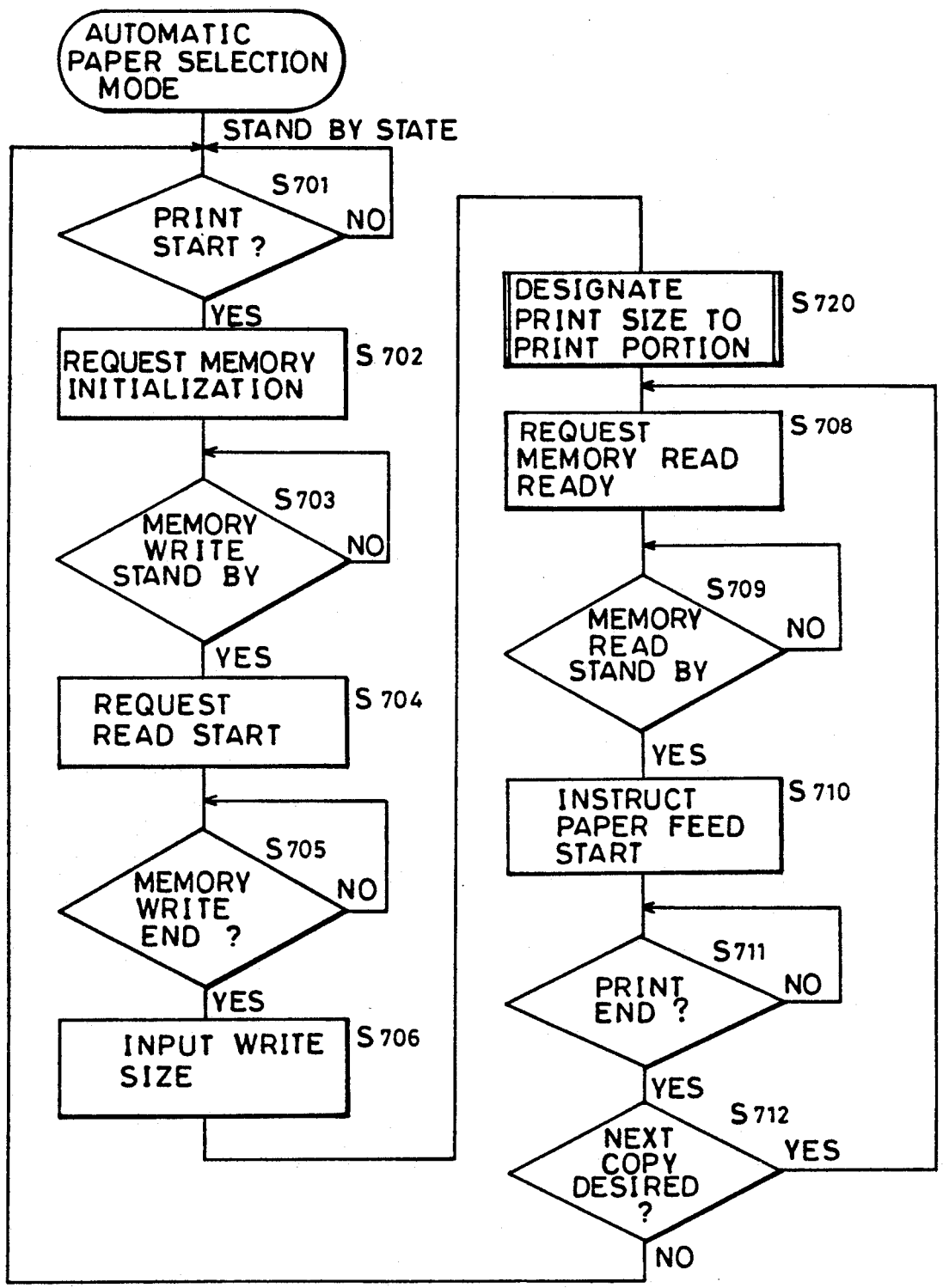
FIG. 24 is a flow chart showing the contents of control of a system controller in accordance with one embodiment of the present invention.

FIG. 24 is a flow chart of the system controller 10 showing the control process for the automatic paper selection model.

When the print switch 34 is turned ON in the step S701, a request for initializing the image memory 54 is applied to the image memory portion in the step S702. If it is determined that the memory is ready for writing in the step S703, the start of reading operation is instructed to the image reader portion 40 in the step S704.

When it is determined that the writing operation to the memory is completed in the step S705, the most suitable size of the paper to be fed is set in the step S706 based on the amount of data written in the memory.

Accordingly, the size of the paper is designated to the printer portion 60 in the step S720. The details of the process will be described later (see FIG. 25).

Thereafter, in the step S708, instruction is given to the memory to be ready for the reading operation. If it is determined that the memory is ready for the reading operation in the step S709, then the paper feed start is instructed to the printer portion 60 in the step S710. If it is determined that the printing is finished in the step S711, then whether the next printing is required or not, that is, multicopy is to be provided or not is checked. If the next printing is required, the flow returns to the step S708 to continue the reading operation from the memory. If the next printing is not required (NO in S712), the flow returns to the step S701 to be in the waiting state until the start of the operation of the print switch 34.

Figure 25:
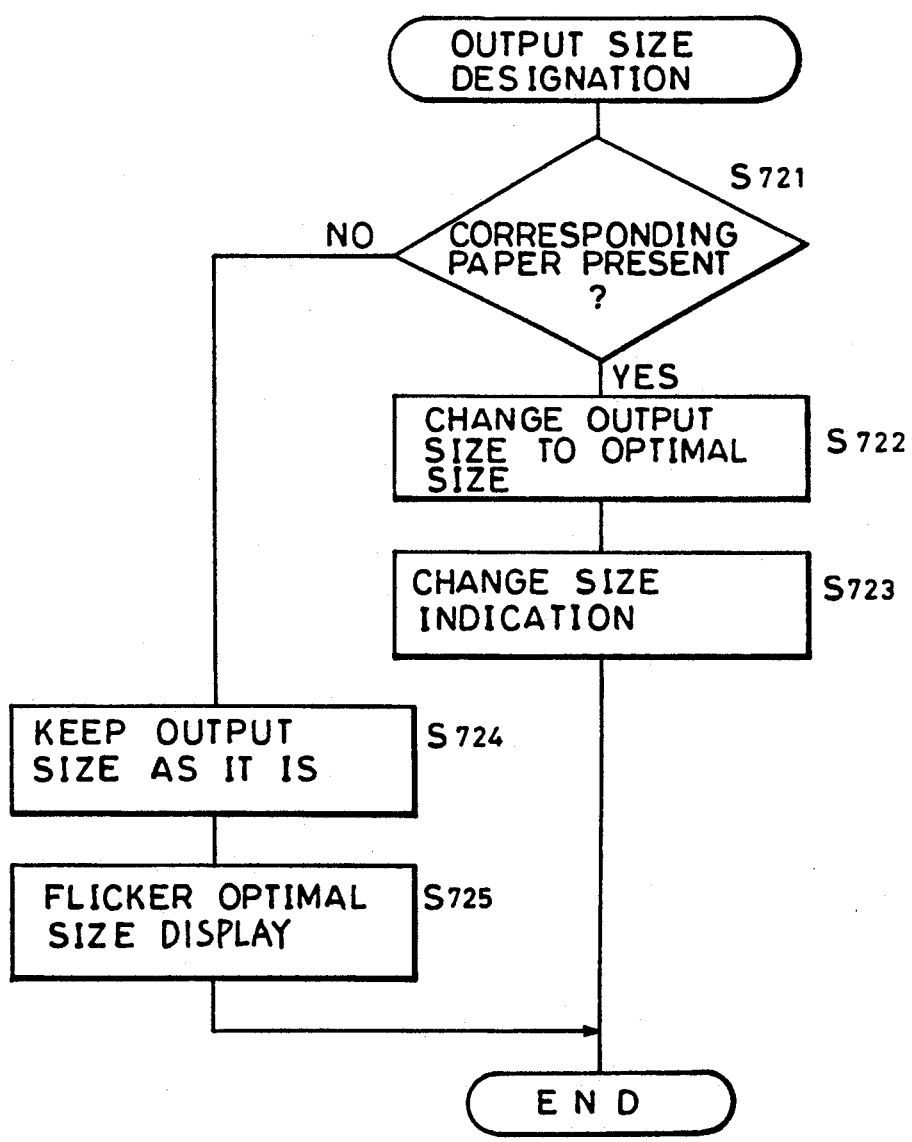
FIG. 25 is a flow chart showing the contents of the output size designating routine shown in FIG. 24.
Figure 26:
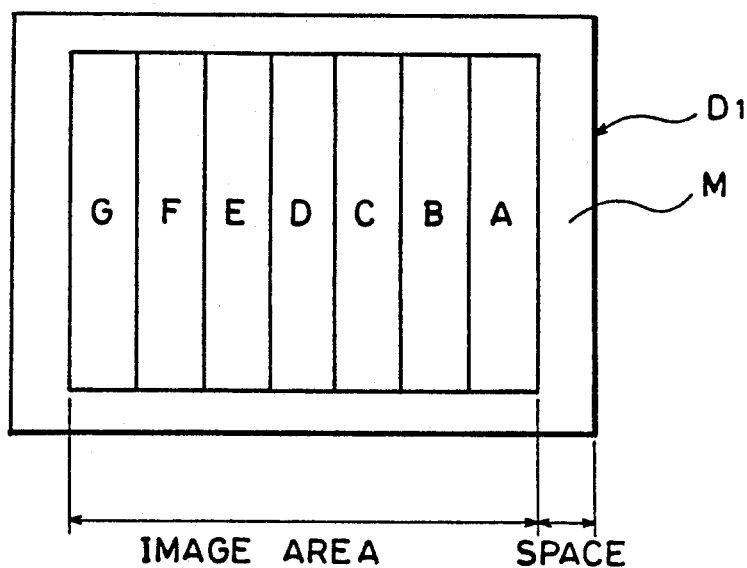
FIG. 26 is a front view showing the arrangement of an original of one's family register.
Figure 27:
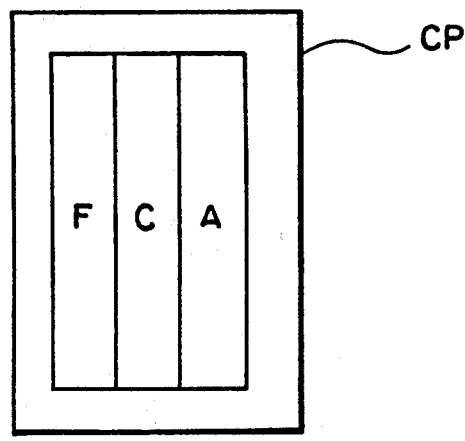
FIG. 27 is a front view showing a copy of the family register shown in FIG. 26 provided by column skip edition.

FIG. 25 shows the contents of the output size designating routine shown in FIG. 24.

In the step S721, whether the paper corresponding to the most suitable size to be fed is present or not in the cassette of the printer portion is checked. If the corresponding paper is set, the output size is changed in the step S722, and the size indication on the operation panel 30 is changed in the step S723.

If the corresponding paper is not set, the initially selected cassette is directly selected in the step S724. In order to indicate that the output size is not changed, the most suitable size is flickered on the size indicating portion of the operation panel as a warning.

If there is no paper of the corresponding size in the step S721, the output size may alternatively be changed to provide a paper of the size permitting printing thereon.

In the present invention, when the valid size of the memory written in the memory after the edition utilizing the column skip levers is reduced, a suitable paper corresponding to the reduced valid size is selected, preventing waste of papers. In addition, the most suitable size is automatically detected, facilitating the operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying machine comprising:
   a platen on which an original is placed;
   optical scanning means having an image sensing device and operating means for reading images of the original placed on said platen;
   area designating means for designating a plurality of areas of said placed original;
   memory means for storing some of image data read by said scanning means, said some of image data corresponding to the areas designated by said area designating means;
   image forming means for forming images on a paper based on the image data stored in said memory means; and
   paper size determining means for automatically determining a size of said paper based on an amount of image data stored in said memory means.

2. A copying machine according to claim 1, wherein said memory means comprises a bit map memory, and stores said image data line by line in said bit map memory.

3. A copying machine according to claim 2, wherein said paper size determining means comprises
   counting means for counting number of lines of the image data stored in said bit map memory,
   said paper size determining means determining the size of said paper based on a counted value counted by said counting means.

4. A copying machine according to claim 1, wherein said area designating means comprises
   at least two indicating members arranged on an end portion of said platen along a scanning direction of said scanning means, said members arranged movable in said scanning direction, and
   detecting means for detecting positions of each of said indicating members;
   said memory means removes image data of the original included in a scanning area sandwiched by two of said indicating members scanned by said scanning means, and continuously stores image data of the original included in areas scanned before said sandwiched area and scanned after said sandwiched area, in response to detected outputs from said detecting means.

5. A copying machine according to claim 4, further comprising:
   control means for controlling said memory means such that every time said detecting means detects a position of said indicating member, the storing operation of said memory means of the image area of the original included in the scanning area behind the detected indicating member is inverted from the storing operation of said memory means before the detection of said indicating member.

6. A copying machine according to claim 4, wherein said indicating member has a mark on the rear surface thereof, said scanning means scanning said original as well as said mark to project the image of said mark to said image sensor.

7. A copying machine according to claim 4, further comprising:
   irradiating means for irradiating the original placed on said platen from under said platen,
   said indicating member positioned based on the content of the original which is highlighted by the irradiation of said irradiating means.

8. A copying machine comprising:
   a platen on which an original is placed;
   optical scanning means having a one dimensional image sensor for projecting images of said original on said image sensor by scanning the original placed on said platen;
   at least two indicating members arranged on an end portion of said platen along said optical scanning direction, said members movable in said scanning direction;
   detecting means for detecting a position of each of said indicating members;
   output means for outputting image data read by said image sensor;
   memory means for storing the image data;
   control means responsive to detection outputs from said detecting means for controlling said memory means such that the image data of the original included in a scanning area scanned by said optical scanning means sandwiched by two of said indicating members are removed and the image data of the original included in the area scanned before said sandwiched area and an area scanned after said sandwiched area are continuously stored;

image forming means for forming images on a paper based on the image data stored by said memory means;

data amount checking means for checking the amount of the image data stored in said memory means; and paper size determining means for automatically determining the size of said paper in response to an output from said data amount checking means.

9. A copying machine according to claim 8, wherein said memory means comprises a bit map memory and stores said image data line by line to said bit map memory.

10. A copying machine according to claim 9, wherein said data amount checking means comprises:

counting means for counting number of lines of the image data stored in said bit map memory, and said paper size determining means determines the size of said paper based on a counted value counted by said counting means.

11. A copying machine according to claim 8, further comprising:

mode designating means for designating a mode in which determination of the paper size is automatically carried out; and paper designating means for designating the size of the paper, wherein designation of said paper designating means is made invalid and said paper size determining means is activated in response to the designating output from said mode designating means.

12. A copying machine according to claim 8, wherein said detecting means comprises a light detecting device that detects diminished light reflected from a reflecting means corresponding to the position of said indicating members.

13. A copying machine according to claim 12, wherein said reflecting means comprises a reflecting tape.

14. A copying machine according to claim 12, wherein said reflecting means comprises a reflecting paint.

* * * * *